(12) United States Patent
Drecq

(10) Patent No.: US 6,308,666 B1
(45) Date of Patent: Oct. 30, 2001

(54) INTERNAL COMBUSTION ENGINE HAVING MEANS FOR RECIRCULATING EXHAUST AND TURBO BOOST GASES

(76) Inventor: Daniel Drecq, 8, rue Octave Allaire, 78610 Saint Leger en Yvelines (FR)

( * ) Notice: Subject to any disclaimer, the term of this patent is extended or adjusted under 35 U.S.C. 154(b) by 0 days.

(21) Appl. No.: 09/485,811
(22) PCT Filed: Sep. 7, 1998
(86) PCT No.: PCT/FR98/01908
§ 371 Date: Feb. 14, 2000
§ 102(e) Date: Feb. 14, 2000
(87) PCT Pub. No.: WO99/13205
PCT Pub. Date: Mar. 18, 1999

(30) Foreign Application Priority Data

Sep. 11, 1997 (FR) .................................................. 97 11294

(51) Int. Cl.⁷ .................................................. F02M 25/07
(52) U.S. Cl. .................................. 123/58.8; 123/568.11; 123/568.15
(58) Field of Search .................. 123/58.8, 568.11, 123/568.12, 568.14, 568.15, 568.19, 568.21

(56) References Cited

U.S. PATENT DOCUMENTS

| | | | |
|---|---|---|---|
| 3,924,576 | * 12/1975 | Siewert | 123/58.8 |
| 4,250,850 | * 2/1981 | Ruyer | 123/58.8 |
| 4,506,633 | * 3/1985 | Britsch | 123/58.8 |
| 4,561,253 | * 12/1985 | Curtil | 123/568.14 |
| 4,917,054 | * 4/1990 | Schmitz | 123/58.8 |
| 5,937,834 | * 8/1999 | Oto | 123/568.15 |

FOREIGN PATENT DOCUMENTS

| | | |
|---|---|---|
| 31 37 454 | 3/1983 | (DE) . |
| 31 42 891 | 5/1983 | (DE) . |
| WO 95/14853 | 6/1995 | (WO) . |

* cited by examiner

Primary Examiner—Willis R. Wolfe
(74) Attorney, Agent, or Firm—Connolly Bove Lodge & Hutz LLP

(57) ABSTRACT

The invention concerns an internal combustion engine devoid of mechanical turbo boost means comprising n cylinders (C1, . . . , C4) each provided with a piston with reciprocating translation movement, each cylinder being equipped with q exhaust valves and r induction valves, q and r being whole numbers not less than 1, each cylinder being, in an operating cycle, filled with air and fuel, a subsequent combustion with expansion supplying the energy delivered by the engine and an exhaust for evacuating burnt gases, the exhaust valves of n cylinders being connected to p exhaust manifold branches such that, on the same manifold branch, n' cylinders are coupled with n'<n and p<n, each exhaust manifold branch (D) being connected to the exhaust gas outlet by a closure member (B) and connected to the atmosphere by at least one breather vent valve (SS) and each cylinder comprising, over part of its operating cycle, three successive phases $\phi 1$, $\phi 2$, $\phi 3$, the n' groups of three phases of the whole set of n cylinders connected to common manifold branch covering the engine entire operating cycle.

20 Claims, 4 Drawing Sheets

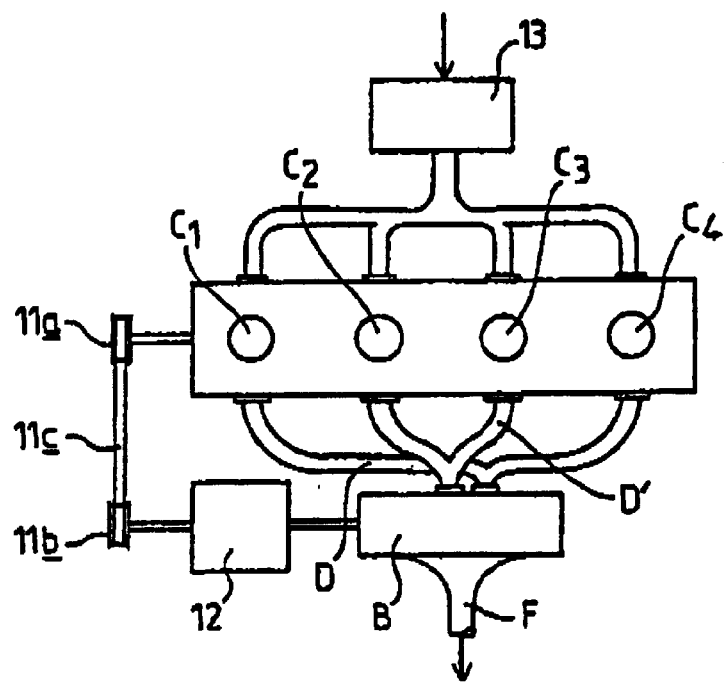
FIG. 4
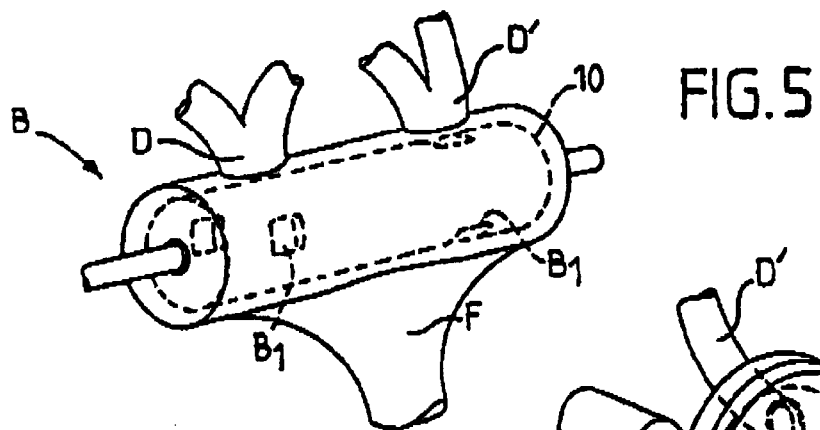
FIG. 5
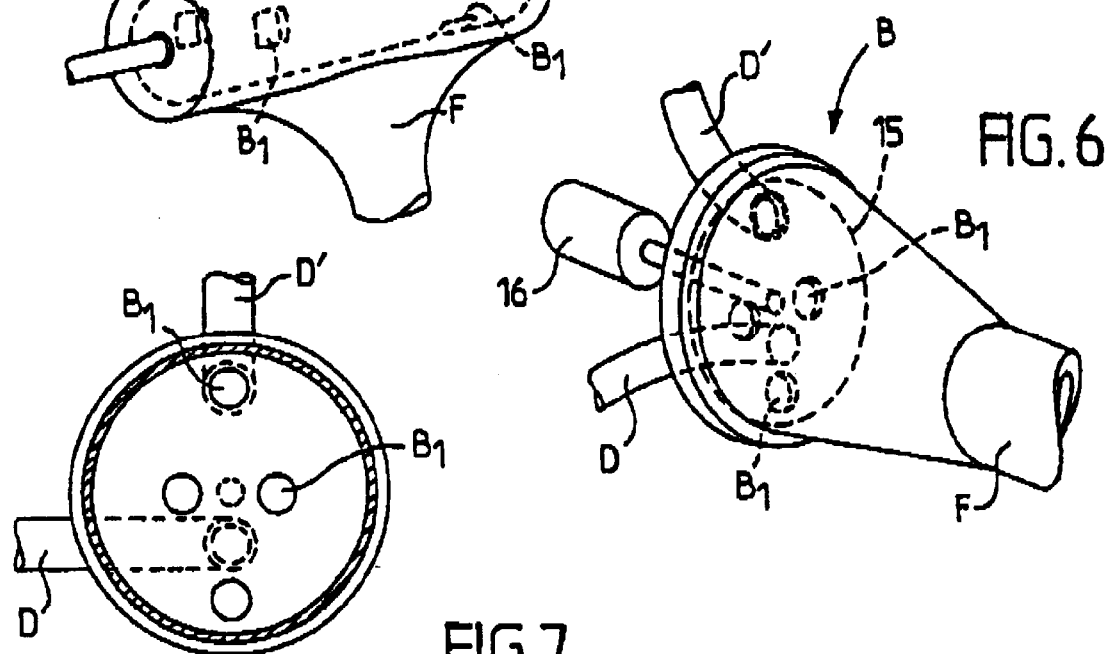
FIG. 6
FIG. 7

INTERNAL COMBUSTION ENGINE HAVING MEANS FOR RECIRCULATING EXHAUST AND TURBO BOOST GASES

The present invention relates to an internal combustion engine with means for recirculating the exhaust and supercharge gases.

It is known that the level of polluting oxides of nitrogen (NOx) emitted by an internal combustion engine can be reduced by returning some of the exhaust gases to the inlet pipe using a valve placed on a branch of the exhaust manifold, this valve being controlled by a computer.

It is also known practice, particularly from patent application WO 95/14853, in a mechanically supercharged engine, to use the exhaust gas pressure wave to perform automatic supercharging through a post-filling effect. An engine of this kind is supercharged by a compressor driven by a turbine through which the exhaust gases pass, the turbine acting as a restriction on the exhaust so as to allow the pressure wave to perform the post-filling.

The subject of the present invention is an engine equipped with means which both allow the exhaust gases to be recirculated and allow pressure wave supercharging using the pressure wave of the exhaust gases and do so in a combustion engine which has no mechanical means of supercharging.

The subject of the present invention is therefore an internal combustion engine with no mechanical supercharging means, having n cylinders each equipped with a piston with a reciprocating translational movement, each cylinder being equipped with q exhaust valves and r inlet valves, q and r being whole numbers greater than or equal to 1, possibly differing from one cylinder to another, each cylinder, in an operating cycle, involving filling with air and fuel, combustion with subsequent expansion providing the energy delivered by the engine and exhaust for discharging the burnt gases, the exhaust valves of n cylinders being connected to p exhaust manifold branches so that, in one same branch of the manifold, n' cylinders are connected with n'<n and p<n, characterized in that each exhaust manifold branch D,D' is connected to the exhaust gas outlet by a shut-off member and is connected to the atmosphere by at least one vent valve SS and that each cylinder of the engine includes, in part of its operating cycle, three successive phases $\phi 1$, $\phi 2$, $\phi 3$, the n' groups of three phases for all of the n' cylinders connected to one same manifold branch covering the entirety of an engine operating cycle, the said three phases being, for a cylinder C, defined as follows:

in the first phase $\phi 1$, at least one exhaust valve and at least one inlet valve are open, at least one vent valve is open in the manifold branch connected to C, the shut-off member for the said manifold branch is closed, the piston of the cylinder C moves towards bottom dead centre so as to fill its cylinder;

In the second phase $\phi 2$, the said shut-off member is closed as is (or are) the vent valve(s) of the said manifold branch, all the inlet valves are closed, at least one exhaust valve is open; at least one other cylinder C' of the n' of the same manifold branch has at least one exhaust valve open and is in its phase of emptying the exhaust gases, its piston moving upwards towards top dead centre, the pressure wave which, in the said manifold branch comes from the cylinder C' in its exhaust phase, driving the air and possibly the burnt gases into the cylinder C which is not exhausting;

in the third phase $\phi 3$, the said shut-off member is open, the vent valve or valves is (or are) closed, the exhaust and inlet valves of the cylinder C are closed, the piston of the cylinder C is travelling upwards towards top dead centre while the cylinder C' connected to the same manifold branch has at least one of its exhaust valves open, all its inlet valves being closed, the upstroke of the piston of the cylinder C' towards top dead centre causing its burnt gases to be emptied out through shut-off member; after which the cylinder C, during compression, moves into the combustion phase, its piston then being driven back, by the expansion of the burnt gases, towards bottom dead centre until it returns to the start of phase $\phi 1$ of its cycle.

Advantageously, the engine according to the invention is characterized in that it includes: at least one exhaust manifold branch connecting at least two associated cylinders in which the pistons perform the same movement towards top dead centre or towards bottom dead centre; the said exhaust manifold branch being, on the one hand, fitted with at least one vent valve, controlled by any appropriate means and, on the other hand, connected to the exhaust gas outlet pipe with the interposition of a shut-off member also controlled by any appropriate means; the inlet, exhaust and vent valves and the shut-off members being operated in synchronism so that the following occur in the engine: the induction of air through the inlet valve in one cylinder that is performing the inlet stroke; the induction through the exhaust valve of the said cylinder of the exhaust gases which lie in the branch of the manifold associated with the cylinder, with the entry of air into the said branch through the vent valve; then the driving into the said cylinder through the said exhaust valve of the air previously let into the manifold branch by the vent valve, through the pressure pulse effect of the burnt gases of another associated cylinder, the exhaust valve of the latter being open, thus achieving supercharging; and finally the discharging of the remainder of the burnt gases from the associated cylinder to the exhaust manifold through the shut-off member placed in the open position.

As a preference, the engine according to the invention is a four cylinder engine operating on a four-stoke cycle, the said cylinders being synchronized in the order 1, 3, 4, 2, the said engine having two manifold branches each associating a pair of cylinders, each manifold branch having at least one vent valve and being connected to the exhaust gas discharge with the interposition of a shut-off member so that during the engine operating cycle, the following occur:

a) induction of air through the inlet valve or valves of the first cylinder performing the inlet stroke;

b) induction, through the exhaust valve or valves of the said first cylinder of the exhaust gases lying in the exhaust manifold branch associated with the said first cylinder, at least one vent valve of the said manifold branch being open;

c) induction of a certain amount of air into the said exhaust manifold branch;

d) opening of the exhaust valve or valves of the cylinder advantageously connected to the first cylinder with the entry into the corresponding manifold branch of a pressure wave which drives the gas lying in the exhaust manifold into the first cylinder through its exhaust valve or valves;

e) discharging of the exhaust gases from the cylinder advantageously connected to the first cylinder, these gases being expelled by the piston of the said cylinder into the exhaust gas outlet manifold through the shut-off member which is in the open position;

f) the inlet of fuel into the first cylinder filled, on the one hand, with fresh air let in by the inlet valve or valves and, on the other hand, with additional fresh air let in by the exhaust valve or valves, and finally with recirculated exhaust gas let in by the same exhaust valve or valves; followed by combustion of the air-fuel-recirculated gases mixture, the piston being driven down to bottom dead centre until it returns to the start of its cycle; in such a way that supercharging and, at the same time, exhaust gas recirculation, are achieved in order to reduce pollution.

In a first alternative form, the shut-off member B is controlled by any appropriate means which allows its instant and period of opening and of closure to be determined at will. In another alternative form, the shut-off member has a rotary plug with two openings separated by two zones, and may or may not be associated with a phase-shifting system, so that by determining the speed at which the plug turns and the dimensions of the openings, its instant and duration of opening and of closure can be determined at will.

In yet another alternative form, the shut-off member is a rotating disc with two pairs of orifices, the orifices of the two pairs being symmetric with respect to the axis of the disc, but at different distances from this axis.

Advantageously, each vent valve is controlled by any appropriate means which allows its instant and duration of opening and of closure to be determined. It is also possible to envisage for a vent valve to be made to open by the depression in the exhaust manifold branch on which it is located.

To give a better understanding of the subject-matter of the invention, a number of embodiments depicted in the appended drawing will now be described by way of purely illustrative and non-limiting examples.

In this drawing:

FIGS. 1 to 3 diagrammatically depict two cylinders of a fuel-injected internal combustion engine which has four cylinders and operates on a four-stroke cycle, the cylinders operating in the usual way in the order 1, 3, 4, 2, these three figures depicting three successive phases of operation of the said engine;

FIG. 4 depicts, diagrammatically in plan view, an engine according to the invention, of the type depicted in FIGS. 1 to 3;

FIG. 5 depicts, diagrammatically in perspective, a first embodiment of a shut-off member that can be used for the engine of FIG. 4;

FIG. 6 depicts, diagrammatically in perspective, a second embodiment of a shut-off member that can be used for the engine of FIG. 4;

Figure 1:
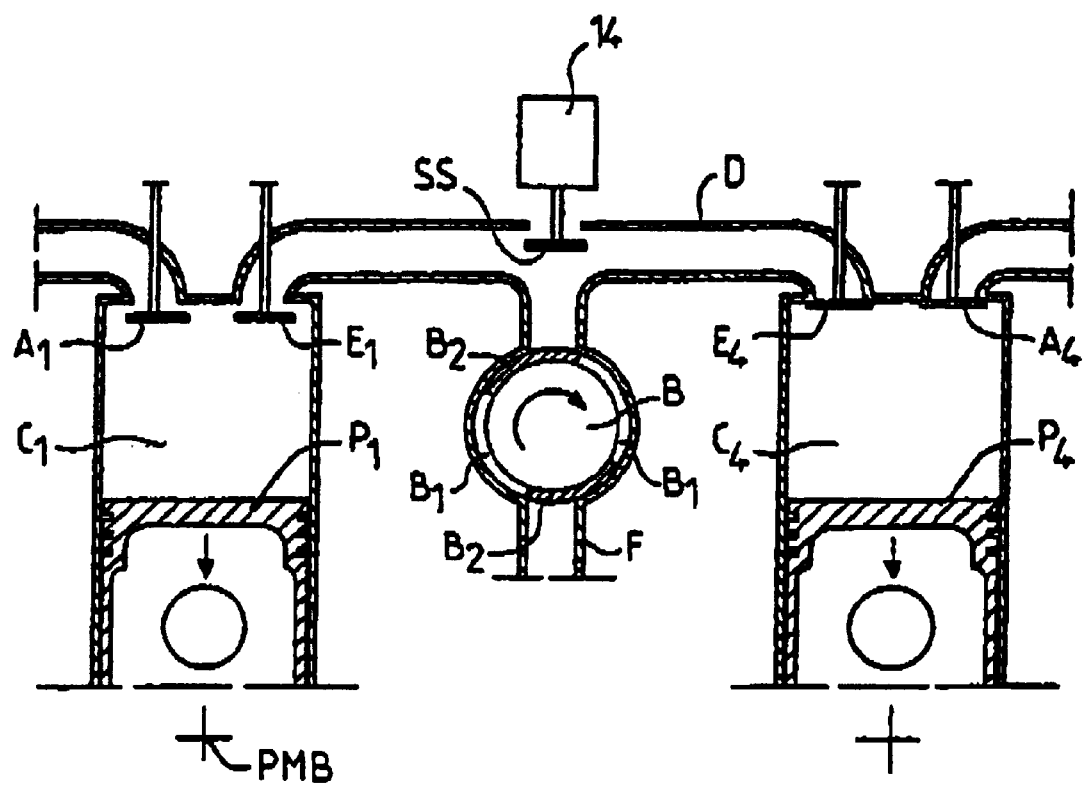
Figure 2:
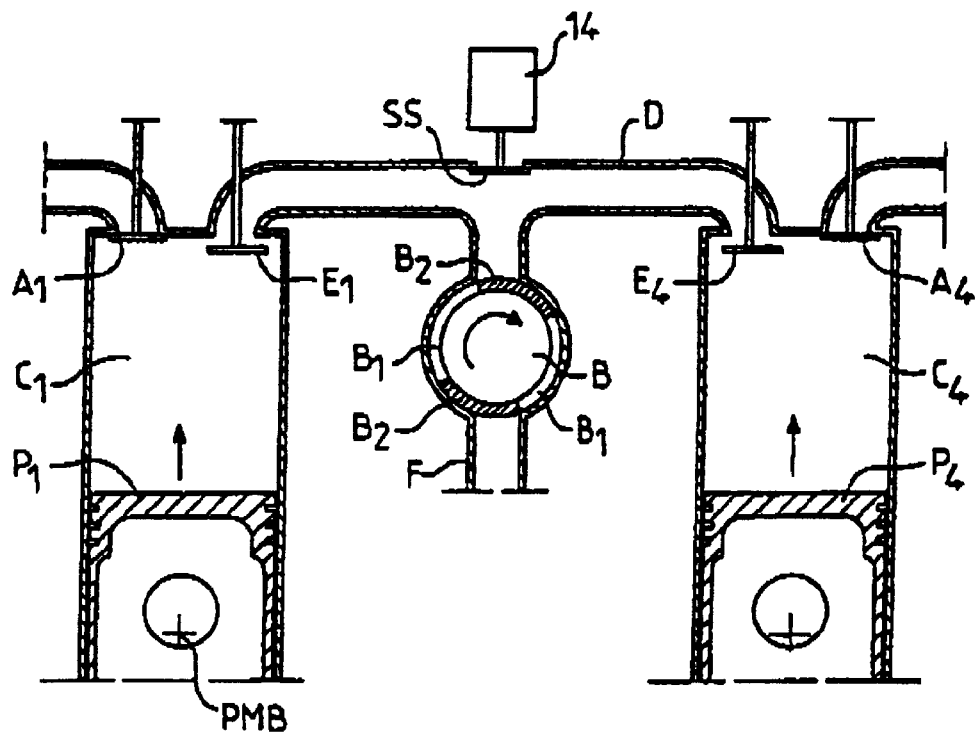
Figure 3:
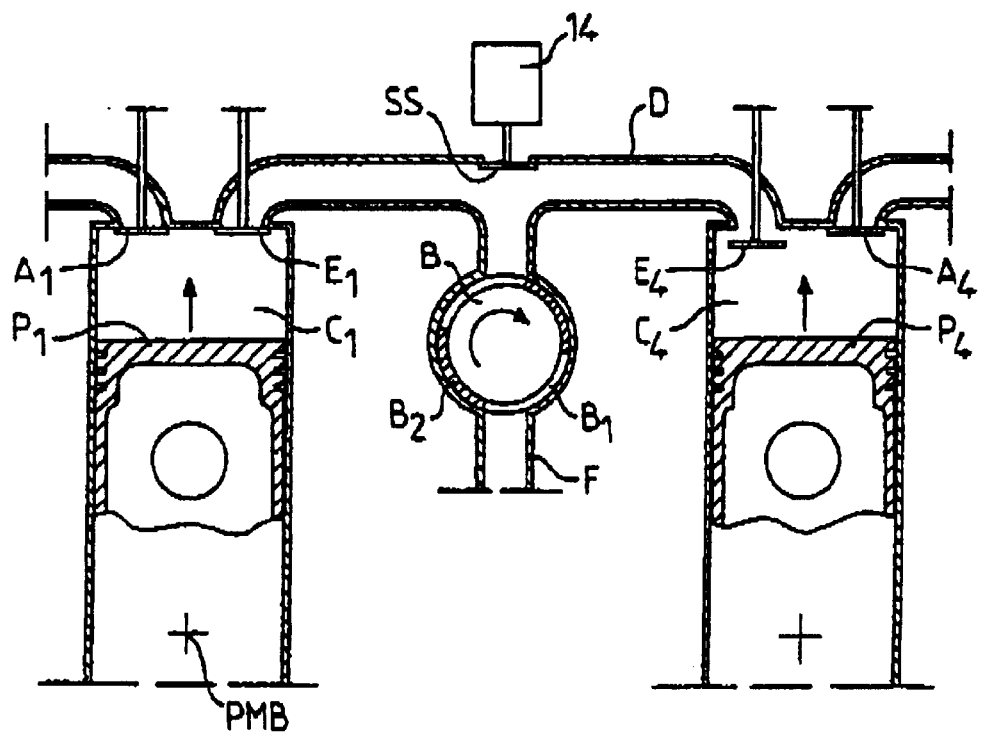
Figure 8:
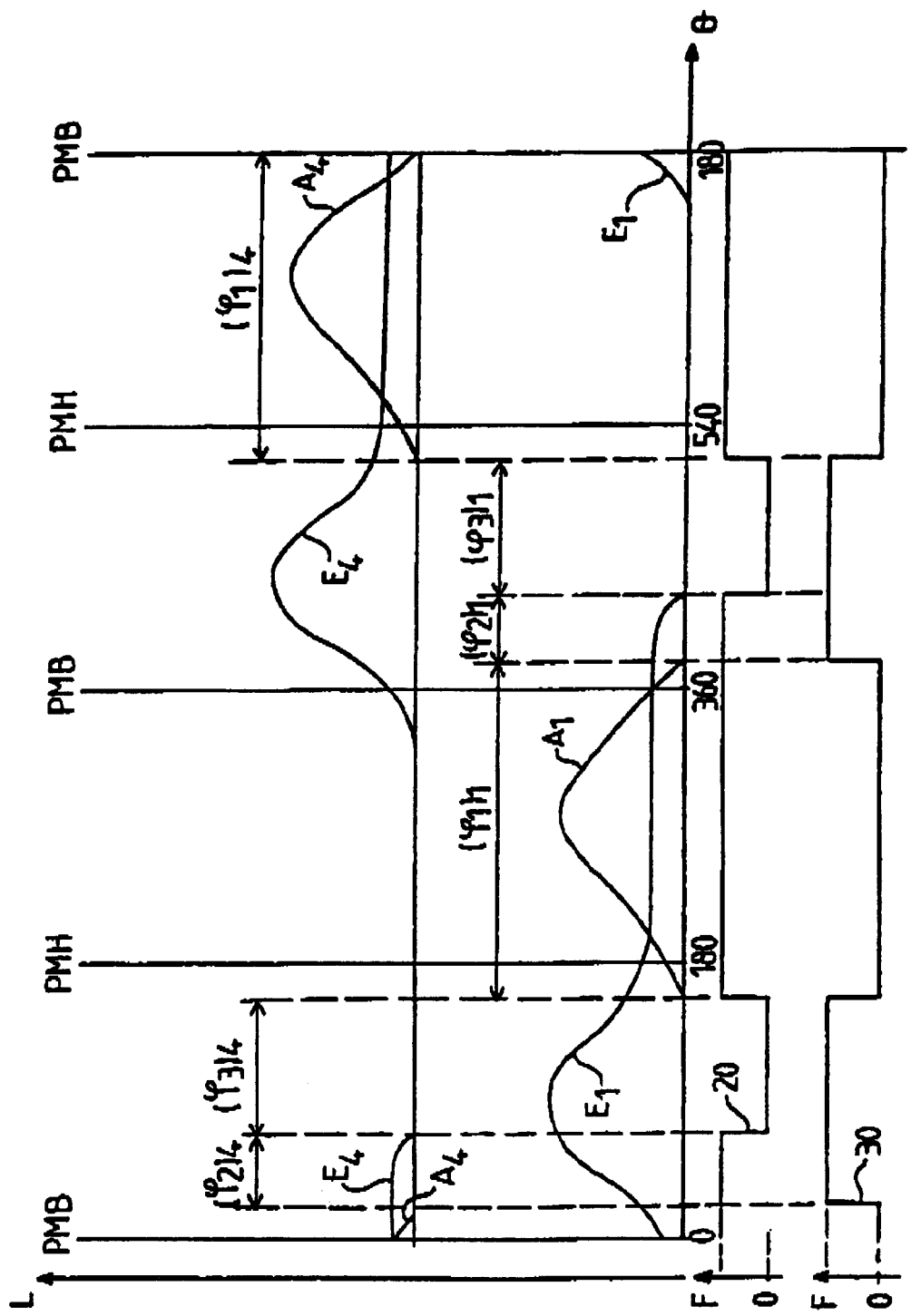

FIG. 7 diagrammatically depicts the shut-off member of FIG. 6, viewed along the axis of its rotating disc;

FIG. 8 depicts the valve lifts L in cylinders 1 and 4 depicted in FIGS. 1 to 3, as a function of the crank angle $\theta$ throughout a cycle and depicts the phases of the opening and closure of the shut-off member (curve 20), on the one hand, and of the vent valve (curve 30) on the other hand, the positions of opening and of closure for these two curves being identified respectively by the letters O and F; the valve-lift curves for cylinder 4 are depicted in the upper part of the graph, the curves relating to the cylinder 1 being arranged beneath the previous ones but above the curve 20; the valve lifts relating to each of the inlet and exhaust valves are identified with an indication of the valve concerned.

In FIGS. 1 to 3, the pistons P1 and P4 of cylinders 1 and 4, denoted by the references C1 and C4 perform, in parallel, the same translational movement either towards bottom dead centre (PMB) in FIG. 1, or towards top dead centre in FIGS. 2 and 3.

In FIG. 4, it can be seen that the cylinders 1 and 4 are coupled together by an identical length manifold branch D, while the cylinders C2 and C3 are coupled together by an identical length manifold branch D'. The manifold branches D and D' are connected to a shut-off member B, the moving part of which is driven by the engine crankshaft; this drive is performed via transmission 11a, 11b, 11c, depicted diagrammatically in the form of a system of pulleys and belts in FIG. 4, drive also being performed via a phase-shifting system 12 which allows the drive of the moving part of the shut-off member to be phase-shifted with respect to the crankshaft. The engine is fed by a feed system 13.

In the embodiment of FIGS. 1 to 4, the cylinders C1 and C4 are coupled together by an exhaust manifold branch D which connects the exhaust valves E1 and E4 of the cylinders C1 and C4. Arranged on this manifold branch D is an additional vent valve SS, the said valve being controlled by any appropriate means 14. The manifold branch D communicates with the exhaust gas outlet pipe F via the shut-off member B which is controlled in such a way as to be sometimes closed (see FIGS. 1 and 2) and sometimes open (see FIG. 3).

In a first embodiment of the shut-off member B, as shown in FIG. 5, and as depicted diagrammatically in FIGS. 1 to 4, a cylindrical plug is produced which has a stationary cylinder in which there turns a moving cylinder 10 which has two pairs of ports B1 diametrically opposed on the cylinder; one of the pairs of ports moves past the inlet of the branch D, and the other moves past the inlet from the manifold branch D', so that when a pair of ports is opposite the mouth of a manifold branch, the exhaust gases can pass through the obstacle that the moving cylinder 10 constitutes to arrive, on a generatrix opposite the one to which the manifold branches D and D' are fixed, at the exhaust pipe F which needs to be wide enough to be able to receive the gases from the orifices B1. In FIG. 5, the ports B1 in the mobile cylinder 10 are depicted in the position in which there is a connection between the manifold branch D' and the exhaust outlet pipe F. The moving cylinder 10 is rotated by the device 11a, 11b, 11c, 12 depicted in FIG. 4.

FIGS. 6 and 7 depict another embodiment of the shut-off member B. In this embodiment, the manifold branches D and D' open to the base of a cone frustum past which there rotates a disc 15 which has two pairs of orifices B1, the orifices of the two pairs being symmetric with respect to the axis of the disc 15 but at different distances from this axis. One of the manifold branches is connected to the base of the cone frustum in such a way as to lie in the path of the orifices B1 of one of the pairs, while the other manifold branch D' is connected to the base of the cone frustum in such a way as to lie facing the path of the other pair of orifices B1. The disc 15 may be rotated by an electric motor 16 or by a system like the one depicted in FIG. 4.

It may thus be seen that in types of embodiment of FIGS. 5 to 7, the opening and closure of the shut-off member B can be brought about at will during the engine operating cycle.

The way in which the device just described works is depicted diagrammatically in FIGS. 1 to 3, and the complete sequence of the operating cycle is depicted in the curves of FIG. 8. Operation involves three successive phases $\phi 1$, $\phi 2$, $\phi 3$. Each phase $\phi i$ for the cylinder 1 is denoted by $(\phi i)1$, while each phase $\phi i$ for the cylinder 4 is denoted by $(\phi i)4$.

To simplify the drawing, it has been assumed that each of the four cylinders of the engine has just one inlet valve (Aj for cylinder number j) and just one exhaust valve (Ej for cylinder number j).

During phase φ1;
in cylinder C1, the two valves A1 and E1 are open, the piston P1 is near to bottom dead centre and is moving downwards towards this dead centre position;
in cylinder C4, the two valves A4 and E4 are closed and the piston P4 moves identically to the piston P1.

In cylinder C4, the burnt gases are expanding and in cylinder C1 induction is taking place and causing air to enter the cylinder through the valve A1. However, at the same time, the exhaust valve E1, having been opened and the shut-off system being in a closed position, there is induction into the exhaust manifold, which is possible because the vent valve SS is open and allows air in. The exhaust gases remaining in the pipe D are therefore drawn in, thus causing exhaust gas recirculation (EGR). Air is drawn in next but does not necessarily get as far as the valve E1. The shut-off member B is in the closed position.

In phase φ2, the pistons P1 and P4 of the cylinders C1 and C4 have just passed bottom dead centre and are beginning to travel back up within the cylinder. The inlet valves A1 and A4 close and the two exhaust valves E1 and E4 are open. In the cylinder C4, the burnt gases which have expanded, driving the piston P4 back, are still at a fairly high pressure (about 10 bar for light load or 40 bar for heavy load, the load corresponding to the position of the accelerator). There is therefore a pressure wave which passes through the exhaust valve E4 to enter the manifold branch D: the amplitude of this pressure wave is about 150 millibar at light load and 2.5 bar at heavy load. The pressure wave travels towards the cylinder C1, the shut-off member remaining closed, even though it has turned relative to the phase φ1 position. The pressure wave drives into the cylinder C1 the air which lies in the manifold branch D and which was let in by the valve SS, now closed; this results in supercharging of the cylinder C1. The invention thus simultaneously allows supercharging and a reduction in nitrogen-oxides pollution, by virtue of the EGR. The valve E1 can be closed before the exhaust gases enter the cylinder C1, but may also be closed a little later in order to perform a little more EGR.

In phase φ3, the valve SS remains closed but the plug valve B opens. The valves A1 and E1 are closed. The valve A4 is also closed but the valve E4 remains open and the plug valve B is open. The exhaust gases from the cylinder C4 pass through the plug valve B and travel towards the exhaust F. The piston P4 empties the cylinder C4 and the piston P1 compresses the air introduced into the cylinder C1 until such time as fuel is injected; after this, the mixture is combusted in the cylinder C1, which is driven towards bottom dead centre until it reaches the position that the cylinder C4 had in the phase φ1 described earlier.

In the example described, the shut-off member B consists of a rotary plug with two orifices B1 separated by two solid parts B2. However, this shut-off member could also consist of a controlled valve or controlled gate valve. The dimensions of the shutting-off parts B2 and of the open parts B1, and the speed of rotation of the plug valve allow the duration of the periods of opening or of closure to be determined at will. In FIGS. 1 and 2, which correspond to phases φ1 and φ2, the plug of the shut-off member B is depicted in a closed position; however, the opening of the plug may be offset using the phase shifter 12 and the amount of EGR after supercharging thus altered.

Of course, each cylinder may have several exhaust valves and several inlet valves. In the case of inlet, all the valves may be open at the same time. By contrast, in the case of the exhaust, of q valves it is possible, in phase φ1 and φ2 to open only q' less than q of the q valves and to do so, in particular, in order not to disrupt the swirling rotation of the charge of air in the cylinder, which rotation is essential for achieving good combustion and therefore good efficiency. In the system, the valves may be operated in any way, for example by a camshaft, by hydraulic or electromagnetic or by pneumatic means or by a hybrid of these various solutions.

The system can operate with any number n of cylinders (n being greater than 1) and with a number p of manifold branches D by connecting n' cylinders to one branch, with n'<n and p<n. It is necessary for each of the p manifold branches to be fitted with a shut-off member such as B. The operation is the same as described earlier in conjunction with FIGS. 1 to 3.

What is claimed is:

1. An internal combustion engine, comprising:
   (n) cylinders (C1, ..., C4), wherein during an operating cycle air and fuel fills each cylinder and combusts, thereby expanding each cylinder to provide the energy delivered by the engine, and the burnt gases formed during combustion of the air and fuel are subsequently discharged;
   a piston having a reciprocating translational movement and being provided within each of the (n) cylinders;
   (q) exhaust valves being provided for each of the (n) cylinders; and
   (r) inlet valves being provided for each of the (n) cylinders, (q) and (r) being whole numbers greater than or equal to 1;
   wherein the exhaust valves connect to (p) exhaust manifold branches, one exhaust manifold branch (D') connecting with (n') cylinders, wherein (n')<(n) and (p)<(n); each exhaust manifold branch (D, D') connecting to an exhaust gas outlet via a shut-off member (B), and to the atmosphere via at least one vent valve (SS); and each of the (n) cylinders includes three successive phases ((φ1, φ2, φ3) during the operating cycle, groups of the three phases for the (n') cylinders being connected to one exhaust manifold branch for the entire operating cycle, for the cylinder (C1), the three phases are defined as follows:
   in the first phase (φ1), at least one exhaust valve (E1) and at least one inlet valve (A1) are open, at least one vent valve (SS) is open in the exhaust manifold branch connected to the cylinder (C1), the shut-off member (B) for the exhaust manifold branch is closed, the piston (P1) of the cylinder (C1) moves towards bottom dead center, thereby filling the cylinder (C1);
   in the second phase (φ2), the shut-off member (B) is closed, the vent valve(s) (SS) of the exhaust manifold branch is/are closed, all the inlet valves (A1) are closed, at least one exhaust valve (E1) is open, at least one other cylinder (C4) of the (n') cylinders of the same exhaust manifold branch has at least one exhaust valve (E4) open, thereby emptying the exhaust gases, and its piston (P4) moves upwards towards top dead center, and the pressure wave which, in the exhaust manifold branch (D), comes from the cylinder (C4) in its exhaust phase, drives the air and/or the burnt gases contained therein into the cylinder (C1);
   in the third phase (φ3), the shut-off member (B) is open, the vent valve(s) (SS) is/are closed, the exhaust valve (E1) and the inlet valve (A1) of the cylinder (C1) are closed, and the piston (P1) of the cylinder (C1) is traveling upwards towards top dead center while the cylinder (C4) connected to the same exhaust manifold branch (D) has at least one of its exhaust valves open and all of its inlet valves closed, the upstroke of the piston (P4) of the cylinder (C4) towards top dead center causing the burnt gases contained therein to be emptied out through the shut-off member (B); and during compression, the cylinder (C1) moves into the combustion phase and drives its piston (P1), by the expansion of the burnt gases contained therein, back towards bottom dead center until it returns to the start of the first phase ($\phi 1$) of the operating cycle.

2. An internal combustion engine according to claim 1, wherein the vent valve (SS) opens by a depression provided in the exhaust manifold branch (D).

3. An internal combustion engine according to claim 1, wherein the shut-off member (D) is controlled to allow determination of its instant and period of opening and closing.

4. An internal combustion engine according to claim 3, wherein the vent valve (SS) is controlled to allow determination of its instant and duration of opening and closing.

5. An internal combustion engine according to claim 1, wherein the shut-off member (B) comprises a rotary plug with two openings (B1) separated by two zones (B2), the speed at which the rotary plug turns and the dimensions of the openings (B1) permits determination of the instant and duration of opening and closing of the shut-off member (B).

6. An internal combustion engine according to claim 5, wherein the vent valve (SS) is controlled to allow determination of its instant and duration of opening and closing.

7. An internal combustion engine according to claim 1, wherein the shut-off member (B) comprises a rotating disc with two pairs of orifices (B1) being symmetrical with respect to the axis of the rotating disc, but having different distances from this axis.

8. An internal combustion engine according to claim 7, wherein the vent valve (SS) is controlled to allow determination of its instant and duration of opening and closing.

9. An internal combustion engine according to claim 1, wherein the vent valve (SS) is controlled to allow determination of its instant and duration of opening and closing.

10. An internal combustion engine according to claim 9, wherein the vent valve (SS) opens by a depression provided in the exhaust manifold branch (D).

11. An internal combustion engine according to claim 1, wherein at least one exhaust manifold branch (D) connects at least two associated cylinders in which the pistons perform the same movement towards top dead center or towards bottom dead center; the at least one exhaust manifold branch (D) being fitted with at least one vent valve (SS), and being connected to an exhaust gas outlet pipe (F) via the shut-off member (B); the inlet valves, exhaust valves, vent valves, and shut off member (B) corresponding to the at least two associated cylinders being operated in synchronism so that the following occur in the engine:

air is inducted through the inlet valve into the cylinder that is performing the inlet stroke;

the exhaust gases contained in the exhaust manifold branch associated with the inlet stroke cylinder is inducted through its exhaust valve, while air enters into the exhaust manifold branch through the vent valve (SS);

the air previously provided in the exhaust manifold branch (D) by the vent valve (SS) is driven into the inlet stroke cylinder, via its exhaust valve, through a pressure pulse effect of the burnt gases of the associated cylinder, the exhaust valve of the associated cylinder being open, to thereby achieve supercharging; and the remainder of the burnt gases from the associated cylinder is discharged to the exhaust gas outlet pipe (F) through the shut-off member (B) being placed in the open position.

12. An internal combustion engine according to claim 11, wherein the shut-off member is controlled to allow determination of its instant and period of opening and closing.

13. An internal combustion engine according to claim 11, wherein the shut-off member (B) comprises a rotary plug with two openings (B1) separated by two zones (B2), the speed at which the rotary plug turns and the dimensions of the openings (B1) permits determination of the instant and duration of opening and closing of the shut-off member (B).

14. An internal combustion engine according to claim 11, wherein the shut-off member (B) comprises a rotating disc with two pairs of orifices (B1) being symmetrical with respect to the axis of the rotating disc, but having different distances from this axis.

15. An internal combustion engine according to claim 11, wherein the vent valve (SS) is controlled to allow determination of its instant and duration of opening and closing.

16. An internal combustion engine according to claim 11, wherein four cylinders (C1, C2, C3, C4) operate on a four-stroke cycle, the four cylinders being synchronized in the order 1, 3, 4, 2, the engine having two manifold branches (D) each associated with a pair of cylinders (C1 and C4 or C2 and C3), each manifold branch (D) having at least one vent valve (SS) and being connected to the exhaust gas outlet pipe (F) via the shut-off member (B), and during the engine operating cycle, the following occur:

air is inducted through the inlet valve (A1) of the first cylinder (C1) during performance of the inlet stroke;

the exhaust gases lying in the exhaust manifold branch (D) associated with the first cylinder (C1) is inducted through the exhaust valves (E1) of the first cylinder (C1), at least one vent valve of the exhaust manifold branch (D) associated with the first cylinder (C1) being open;

a certain amount of air is inducted into the exhaust manifold branch (D) associated with the first cylinder (C1);

the exhaust valves (E4) of the cylinder (C4) are opened and connected to the first cylinder (C1) to allow entry into the exhaust manifold branch (D) associated with the first cylinder (C1) of a pressure wave that drives the gas lying in the exhaust manifold branch (D) associated with the first cylinder (C1) into the first cylinder (C1) through its exhaust valves (E1);

the exhaust gases from the cylinder (C4) are discharged by the piston (P4) of the cylinder (C4) into the exhaust gas outlet pipe (F) through the shut-off member (B) being in its open position;

fuel and air enters into the first cylinder (C1) via inlet valves (A1), additional air enters into the first cylinder (C1) via exhaust valves (E1), and recirculated exhaust gas enters into the first cylinder (C1) via exhaust valves (E1); and the air, fuel, and recirculated gas mixture is combusted, thereby driving the piston (P1) down to bottom dead center until the piston (P1) returns to the start of its cycle.

17. An internal combustion engine according to claim 16, wherein the shut-off member is controlled to allow determination of its instant and period of opening and closing.

18. An internal combustion engine according to claim 16, wherein the shut-off member (B) comprises a rotary plug with two openings (B1) separated by two zones (B2), the speed at which the rotary plug turns and the dimensions of the openings (B1) permits determination of the instant and duration of opening and closing of the shut-off member (B).

19. An internal combustion engine according to claim 16, wherein the shut-off member (B) comprises a rotating disc with two pairs of orifices (B1) being symmetrical with respect to the axis of the rotating disc, but having different distances from this axis.

20. An internal combustion engine according to claim 16, wherein the vent valve (SS) is controlled to allow determination of its instant and duration of opening and closing.

* * * * *